Patented Aug. 9, 1932

1,871,136

UNITED STATES PATENT OFFICE

HARRY STEENBOCK, OF MADISON, WISCONSIN, ASSIGNOR TO WISCONSIN ALUMNI RESEARCH FOUNDATION, A CORPORATION OF WISCONSIN

ANTIRACHITIC PRODUCT ESSENCE AND PROCESS

No Drawing.    Application filed December 27, 1926.  Serial No. 157,430.

The present invention or discovery pertains to an antirachitically activated substance in concentrated form. In accordance with the preferred process of the present invention, unsaponifiable lipoids are separated from a substance rich therein; and the separated lipoids are subjected to the action of ultra violet rays, such as are contained in the light emanating from a quartz mercury vapor lamp. Treatment of the concentrated unsaponifiable lipoids, or extract, by ultra violet rays, in accordance with the process hereinafter described, results in antirachitically activating these lipoids, so that the activated concentrate, or extract, will serve as an excellent therapeutic agent adapted to prevent or cure rachitis, or rickets. The activated essence of lipoids may be used in medicinal quantities; or, if desired, the activated essence may be introduced, in limited quantities, in foods of various kinds, thus imparting antirachitic properties.

For example, a small percentage of such antirachitically activated essence may be introduced into edible substances, including edible fats, butter, butter substitutes, such as oleomargarine and nut margarine, edible oils, salad dressings, milk, cream, breakfast foods, starch, yeast, meals, etc., infant foods, dried milk, etc. The activated food substances may be eaten daily, if desired, and will serve to prevent or effect cure of rachitis.

Food rations for man or animal may have introduced therein such proportion of the antirachitically activated essence as may be desired.

While it is preferred to effect separation of unsaponifiable lipoids from substances rich therein before subjecting such lipoids to the action of ultra violet rays, it is quite possible to treat the substances which are rich in such lipoids with ultra violet rays and afterwards extract the activated lipoids. The process herein described comprehends both methods of pocedure.

The antirachitically activated lipoidal essence may be admixed, if desired, with edible substances and may be thus compounded into medicinal tablets, which can be used as a specific for rachitis. In such case, the activated essence may be contained in the tablet in larger proportion than ordinarily would be used in a food to be taken daily, as, for example, a breakfast food.

It may be stated here that unsaponifiable lipoids are contained in rather high proportion in brains and nervous tissues of animals; also, the solid and liquid glycerides as obtained by extraction from plant and animal materials generally are fairly rich in unsaponifiable lipoids; also, unsaponifiable lipoids are present generally in grains, cereals, seeds, etc., but in less proportion than in the glycerides.

According to the preferred method of the present invention, an essence of lipoids is obtained from materials rich therein. For example, a lipoidal extract may be obtained from the brains of animals which may be procured at a slaughter house, and such extract, or essence, may be treated with ultra violet rays and may thus be antirachitically activated.

As an example of the preferred method, brains obtained from a slaughter house may be mixed with plaster of Paris, thus producing a friable mass; this material preferably is pulverized and treated with cold acetone; the acetone is evaporated to a small volume to cause the separation of the impure unsaponifiable lipoids; these lipoids may then be filtered off and boiled with an alcoholic solution of NaOH or KOH, and then diluted with water, and the unsaponifiable lipoids extracted with ether. The ether solution containing the lipoids forms a top layer and may be decanted, and may then be washed with water and evaporated, yielding the unsaponifiable lipoids as a waxy material.

The waxy material described may be subjected to the action of ultra violet rays after being separated from the ether, or it may be retained in solution in ether while being acted upon by the ultra violet rays. Where the waxy material is treated directly, it is spread in a thin film, say one-eighth of an inch thick, or thinner; and in such thin layer it is exposed, with stirring, to the action of the rays of a Cooper-Hewitt quartz mercury vapor lamp, type B Y, for twenty to thirty minutes, or longer, such lamp having an arc initially of about one and one-half inches and later of about three inches, and operated by current of about four amperes at about forty-eight volts. Thus treated, the waxy essence of unsaponifiable lipoids acquires an antirachitic strength very much greater than that possessed by cod liver oil.

If it be desired to treat the lipoidal essence in solution, it may be done by exposing the solution to the action of ultra violet rays. For example, the solution may be passed in a thin film through rays emanating from a series of quartz mercury vapor lamps, intensity, distance and time of exposure being regulated to produce the desired result.

Another method of effecting separation of unsaponifiable lipoids from brains of animals is as follows: Dry the brains at about 80° to 100° C.; pulverize the material and extract the lipoids with alcohol; add a strong solution of NaOH or KOH to the alcoholic extract and boil the mixture to effect saponification of the saponifiable constituents; then dilute the mixture with water, and treat with ether to extract the unsaponifiable constituents. These will be obtained in crude form as a semi-crystalline waxy residue upon evaporation of the ether, and they may be treated in this form by ultra violet rays, or they may be so treated while in solution. If desired, the solution may be applied to food materials and the ether may then be evaporated, after which antirachitic activation may be effected; or, if desired, an ether solution of the activated unsaponifiable constituents may be mixed with food materials, and the ether may then be evaporated.

It may be stated that if it be desired to still further purify the unsaponifiable constituents obtained from the ether solution, this may be effected by boiling them in alcoholic solution with animal charcoal and then recrystallizing them from the alcohol. Thus, there will be obtained from brain a mass of unsaponifiable lipoids consisting largely of cholesterol in rather pure state, which can be activated by treatment with the ultra violet light to a very high degree.

Oils and fats are amenable to the practice of the present process. Examples are olive oil, corn oil, peanut oil, cocoanut oil, cotton seed oil, oleo oil, almond oil, lard, tallow, etc. The unsaponifiable lipoids in these substances may be antirachitically activated before or after separation, and the separation may be effected in a manner analogous to the separation of unsaponifiable lipoids from brain matter. However, these substances are not so rich in unsaponifiable lipoids as is brain; hence, in procuring a lipoidal essence, it is preferred to use brains as a source of supply.

The unsaponifiable lipoids present in animal tissues and animal glycerides are known as zoosterols, and of these cholesterol is the best known representative; the unsaponifiable lipoids present in plant tissues and plant glycerides are known as phytosterols. Collectively they are classed as sterols. There is reason to believe that there are other compounds besides these sterols, probably combinations of them with other substances, which can be antirachitically activated in the manner described above, but so far as revealed by investigation the ordinary unsaponifiable lipoids are the chief constituents capable of receiving the antirachitic activation in marked degree.

Olive oil, for example, may be exposed to ultra violet rays in the manner described above and may thus be antirachitically activated. This activation may be effected to a degree approaching the maximum within a period of twenty or thirty minutes. However, the irradiation may continue for a longer period, say an hour or two, without destroying the antirachitic principle, effecting bleaching, or injuring the taste. On the other hand, if the treatment of the olive oil be continued for too great a period, say in the neighborhood of ten hours, the antirachitic factor is weakened, and the factor is destroyed within a period of about seventeen hours. It is desirable, therefore, to limit the period of treatment so that the antirachitic principle, after it has been produced, will not be weakened, or destroyed. This is particularly true where the antirachitic activation of the unsaponifiable lipoids is effected before separation of the lipoids from the parent substance. Where the lipoids are separated before treatment with ultra violet rays, the light treatment may be more prolonged, without injury, than is the case where the activation is effected by treating the parent substance containing the lipoids.

The length of time of exposure to the rays may vary greatly, depending upon the volume of the product being treated, the manner in which it is exposed, the intensity of the light, and the distance of the material from the light. Quartz permits the passage of ultra violet rays quite readily. If the rays are required to pass through other material before impinging upon the material to be treated, this may operate to require an increased period of exposure.

It may be stated here that the activated material maintains its activated condition for prolonged periods; and, while it has not been determined what rate of loss, if any, may occur, the activated condition is maintained for a sufficient length of time for the practical purposes suggested herein.

Bone known to be definitely rachitic shows a more or less characteristic histological bone picture. On the other hand, normal bone produces a picture distinct from that of the rachitic bone. The rachitic bone may be restored to the normal by using a food impregnated with the antirachitically activated lipoidal extract, or by using the activated extract in medicinal does. The activated extract may be compounded with suitable edible materials; and, if desired, the compounded materials may be pressed into tablet form, and thus served as an antirachitic medicine. For example, a tablet may be formed by mixing corn meal, wheat flour, an edible oil, and a minor portion of the activated lipoidal essence and compressing the mixed materials into tablets. If desired, a solution of the lipoidal extract may be used in effecting the mixture, the solvent being evaporated after the mixing operation. The proportions may vary greatly depending upon the desired strength of the compound. It is preferred to employ about ten percent or less of the activated lipoidal essence in the medicinal compound. The proportion may be increased, however.

Yeast may be irradiated and antirachitically activated. Also, yeast may have incorporated therein a minor proportion of antirachitically activated unsaponifiable lipoids, thus the yeast may carry not only the so-called antirachitic vitamin, or factor, but may also contain such other vitamin or vitamins as is ordinarily present in yeast. The antirachitically activated material may be incorporated in the yeast without introducing any unpleasant flavor. or injuring any of the qualities which the yeast ordinarily possesses. Generally, it may be stated that the antirachitic activation of unsaponifiable lipoids may be effected without producing unpleasant taste, or odor. Therefore, the artifically activated materials are susceptible to more extensive use and may be more pleasantly employed than cod liver oil.

Yeast is rich in unsaponifiable lipoids (partly in free condition and partly in combined condition) and is amenable to treatment for producing an activated essence. The irradiation may be effected before or after the separation of these lipoidal substances from the yeast, which may be accomplished in any suitable manner. As is known, yeast is a fungus, and it may be taken as an example of such substances.

The rays which emanate from a quartz mercury vapor lamp have wave-lengths ranging from about 185 to 800 millimicrons or more. This light is rich in ultra violet rays, however. The effective rays for the present process lie within a range of 200 to 400 millimicrons wave-length. In fact, the most effective wave-lengths are within a range of about 230 to 315 millimicrons. Roentgen rays, which have about a wave-length of 50 millimicrons, are not effective for the present process.

It may be remarked, also, that an essence of lipoidal substances, substantially isolated from the parent substance, is capable of becoming potent in the antirachitic factor when subjected to mild irradiation with ultra violet rays. This may be due to the fact that substances which might interfere largely with activation are not present in such degree as to greatly hinder the activation; and it may be due partly to the fact that in such a concentrate the activation of a portion only of the lipoidal substances will nevertheless give a marked antirachitic potency to the substances per unit of weight. While it is preferred to employ artificial rays substantially in the manner described, it is not desired to limit the invention unnecessarily in this respect or in other respects.

The oils mentioned above are liquid glycerides found in plant and animal tissues and are fairly rich in unsaponifiable lipoids. These oils (liquid fats) constitute an important subdivision of the fats.

The present application is a continuation in part of my application Serial No. 723,171, filed June 30, 1924, issued as Patent No. 1,680,818 and claims are included herein for subject-matter originally disclosed in the application here mentioned.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The process of producing a concentrated antirachitically activated substance from substances rich in unsaponifiable lipoids, which comprises separation and irradiation of said unsaponifiable lipoids, such irradiation being effected by subjecting the lipoids, before or after separation, to the action of ultra violet rays, such as emanate from a quartz mercury vapor lamp for a period sufficient to effect antirachitic activation, but so limited as to avoid subsequent substantial injury to the antirachitic principle.

2. The process of producing an antirachitically activated substance in concentrated form, which comprises subjecting an unsaponifiable lipoidal extract to the action of ultra violet rays, for a period sufficient to effect antirachitic activation but so limited as to avoid subsequent substantial injury of the antirachitic principle.

3. The process of producing an antirachitically activated substance in concentrated form, which comprises subjecting an unsaponifiable lipoidal extract to the action of ultra violet rays for such period and with such intensity as to effect substantially maximum activation but limited to avoid substantial injury to the antirachitic factor.

4. An antirachitically activated edible material comprising antirachitically activated unsaponifiable lipoidal extract, which has been thus activated directly by ultra-violet rays.

5. An activated edible compound comprising an unsaponifiable lipoidal extract activated antirachitically in accordance with the process stated in claim 1, compounded with an unactivated edible substance.

6. An activated edible compound comprising an unsaponifiable lipoidal extract activated antirachitically in accordance with the process stated in claim 1, compounded with an unactivated edible substance, the activated lipoidal extract being taken in minor proportion.

7. A medicinal compound comprising unactivated edible material having incorporated therein a percentage of a lipoidal essence activated in accordance with the process set forth in claim 1.

8. A medicinal tablet comprising a solid unactivated edible substance compounded with a lipoidal essence activated in accordance with the process set forth in claim 1.

9. A medicinal tablet comprising a solid unactivated edible substance compounded with a lipoidal essence activated in accordance with the process set forth in claim 1, the lipoidal essence being present in minor proportion.

HARRY STEENBOCK.